US011487458B2

(12) United States Patent
Trim et al.

(10) Patent No.: US 11,487,458 B2
(45) Date of Patent: Nov. 1, 2022

(54) RISK DETECTION OF DATA LOSS FOR 5G ENABLED DEVICES

(71) Applicant: International Business Machines Corporation, Armonk, NY (US)

(72) Inventors: Craig M. Trim, Ventura, CA (US); Rashida A. Hodge, San Francisco, CA (US); Gandhi Sivakumar, Bentleigh (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 16/695,344

(22) Filed: Nov. 26, 2019

(65) Prior Publication Data

US 2021/0157481 A1    May 27, 2021

(51) Int. Cl.
*G06F 3/06* (2006.01)
*G06F 3/16* (2006.01)
*H04L 67/1095* (2022.01)

(52) U.S. Cl.
CPC ............ *G06F 3/065* (2013.01); *G06F 3/067* (2013.01); *G06F 3/0619* (2013.01); *G06F 3/167* (2013.01); *H04L 67/1095* (2013.01)

(58) Field of Classification Search
CPC ........ G06F 3/065; G06F 3/0619; G06F 3/067; G06F 3/167; H04L 67/1095
See application file for complete search history.

(56) References Cited

U.S. PATENT DOCUMENTS

| 7,348,895 | B2 | 3/2008 | Lagassey |
| 7,865,253 | B2 | 1/2011 | Harrington |
| 9,122,643 | B2 | 9/2015 | Herz et al. |
| 10,007,577 | B2* | 6/2018 | Bronk ................. H04L 63/0428 |
| 10,085,140 | B2 | 9/2018 | Chu et al. |
| 10,506,202 | B2* | 12/2019 | Snyder .................. H04N 7/183 |
| 2010/0331023 | A1 | 12/2010 | Cai |

(Continued)

FOREIGN PATENT DOCUMENTS

| CN | 105183607 A | 12/2015 |
| CN | 107122685 A | 9/2017 |

(Continued)

OTHER PUBLICATIONS

"Optimizing Network Applications for 5G", News | Apr. 21,2017, 2 pages, <https://www.ericsson.com/en/news/2017/4/optimizing-network-applications-for-5g>.

(Continued)

*Primary Examiner* — Idriss N Alrobaye
*Assistant Examiner* — Richard B Franklin
(74) *Attorney, Agent, or Firm* — Brian M. Restauro

(57) ABSTRACT

Embodiments of the present invention provide a computer system, a computer program product, and a method that comprises collecting data capable of being replicated from a computing device; detecting risks of the computing device, wherein detecting risks comprises detecting the computing device's surroundings, location, speed, and condition; initiating data replication on the computing device once the risks are determined to reach a predetermined threshold; and storing the replicated data within a cloud storage system using a 5G network.

18 Claims, 6 Drawing Sheets

(56) References Cited

U.S. PATENT DOCUMENTS

| | | | |
|---|---|---|---|
| 2013/0282660 A1* | 10/2013 | Xu | G06F 11/1458 707/640 |
| 2014/0359777 A1 | 12/2014 | Lam | |
| 2015/0097683 A1 | 4/2015 | Sloo | |
| 2016/0117500 A1 | 4/2016 | Li | |
| 2016/0125726 A1 | 5/2016 | Gordon | |
| 2016/0292464 A1* | 10/2016 | Alarabi | H04W 12/12 |
| 2018/0249069 A1 | 8/2018 | Rakshit | |

FOREIGN PATENT DOCUMENTS

| | | |
|---|---|---|
| CN | 109788169 A | 5/2019 |
| CN | 114787803 A | 7/2022 |
| GB | 2401752 A | 11/2004 |
| WO | 2014113367 A1 | 7/2014 |
| WO | 2018215816 A1 | 11/2018 |
| WO | 2019102344 A1 | 5/2019 |
| WO | 2021105892 A1 | 6/2021 |

OTHER PUBLICATIONS

Disclosed Anonymously, "System and Method for Enforcing Location-Based Mobile Resiliency", An IP.com Prior Art Database Technical Disclosure, IP.com No. IPCOM000242845D, IP.com Electronic Publication Date: Aug. 24, 2015, 5 pages.

Disclosed Anonymously, "Method and Apparatus for Cognitive Hazard Detection and Resistant for User Devices", An IP.com Prior Art Database Technical Disclosure, IP.com No. IPCOM000255260D, IP.com Electronic Publication Date: Sep. 12, 2018, 3 pages.

Mell et al., "The NIST Definition of Cloud Computing", Recommendations of the National Institute of Standards and Technology, NIST Special Publication 800-145, Sep. 2011, 7 pages.

"Risk Detection of Data Loss for 5G Enabled Devices", GB Application No. 2209272.0, filed on Nov. 25, 2022, 23 pages (to be published on Sep. 7, 2022 as GB2604564).

"Risk Detection of Data Loss for 5G Enabled Devices", Germany Application No. 11 2020 005 801.8, filed on Nov. 25, 2022, 51 pages.

"Risk Detection of Data Loss for 5G Enabled Devices", Japan Application No. 2022-525008, filed on Nov. 25, 2022, 48 pages.

International Searching Authority, Patent Cooperation Treaty, Notification of Transmittal of the International Search Report and the Written Opinion of The International Searching Authority, or the Declaration, dated Mar. 9, 2021 (Mar. 9, 2021), International application No. PCT/IB2020/061118, International filing date Nov. 25, 2020 (Nov. 11, 2020), 11 pages.

* cited by examiner

US 11,487,458 B2

RISK DETECTION OF DATA LOSS FOR 5G ENABLED DEVICES

FIELD OF THE INVENTION

The present invention relates generally to the field of data protection, and more specifically detecting risk on 5G devices to prevent data loss by preserving data via data replication and remote data storage.

BACKGROUND

Data storage is the recording of information within a storage medium. This recordation is accomplished by virtually any form of energy, and electronic data storage requires electrical power to store and retrieve data. Electronic data can be stored in much less space than physical data. Furthermore, data replication is the process of storing data in more than one site or node. It is simply copying data from a database from one server to another server, so all users may share the same data without an inconsistency.

Cloud storage is a model of computer data storage in which the digital data is stored in logical pools. The physical storage spans multiple servers, and these cloud storage providers are responsible for keeping the data available and accessible.

5G is the fifth generation cellular network technology, in which the service area covered by providers is divided into small geographical areas called cells. All the 5G wireless devices in a cell communicate by radio waves with a local antenna array and low power automated transceiver in the cell, over frequency channels assigned by the transceiver from a pool of frequencies that are reused in other cells.

SUMMARY

Embodiments of the present invention provide a computer system, a computer program product, and a method that comprises collecting data capable of being replicated from a computing device; detecting risks of the computing device, wherein detecting risks comprises detecting the computing device's surroundings, location, speed, and condition; initiating data replication on the computing device once the risks are determined to reach a predetermined threshold; and storing the replicated data within a cloud storage system using a 5G network.

DETAILED DESCRIPTION

Embodiments of the present invention recognize the need for ways to provide more efficient data protection and storage using risk detection using 5G networks in an environment comprised of computing devices. Embodiments of the present invention provides systems, methods, and computer program products for an improvement to existing data protection and replication systems. Currently, common data protection systems initiate the backup process after predefined regular time intervals that can be used to restore the data when a failure is experienced. Similarly, common data protection systems backup computing devices after hardware is damaged, and configuration needs to be replicated on another machine, which also contain a data gap that may result in some data loss. There are also cloud resources that are used to protect data by replicating the data from the computing device into cloud storage but are unable to actively detect risks. Embodiments of the present invention actively detects risk to a computing device that may lead to data loss, simultaneously replicates the data that may be at risk on the computing device, and exclusively uses a 5G network as communication channels. Embodiments of the present invention can access a subscribed list of computing devices capable of being monitored, collects data from those devices to be replicated, detects mobility, surrounding environments, and conditions of the computing device to determine associated risks to data, imitates a specific data replication alert on the computing device when a certain risk threshold is determined, and stores replicated data safely within the cloud.

Figure 1:
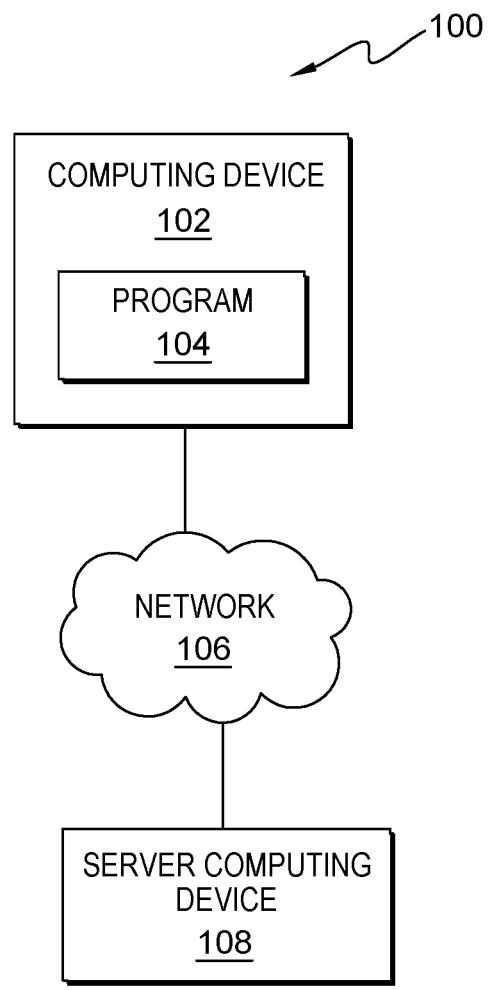
FIG. 1 is a functional block diagram depicting an environment with a computing device connected to or in communication with another computing device in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program on the computing device 102. In another embodiment, the program 104 may be stored on a server computing device 108. In this embodiment, the program 104 accesses a list of computing devices that are capable of being monitored; accesses data from those devices to be replicated; detects mobility, surrounding environments, and conditions of the computing device to determine associated risks to data using a risk identification algorithm (shown in subsequent figure); initiates a specific data replication alert on the computing device when a predetermined risk threshold is reached or exceeded; and stores replicated data safely within the cloud. In this embodiment, the program 104 transmits instructions to the risk identification algorithm, which comprises a cognitive system defined to map content using a priority engine (not shown). The priority engine prioritizes data types on the computing device 102 for data replication. For example, the program 104 accesses a user's smart phone; determines data that may be replicated (i.e., texts, phone numbers, and photos); transmits instructions to the risk identification algorithm to access the devices camera and GPS, detects the location of the device, determines the condition of the device, and detects the surroundings of the device to determine risk such as heights or running water; after detecting viable risks to data on the device, initiates a data replication via a 5G network 106.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention. The network 106 may use an orchestration layer of 5G technology along with existing mobility monitoring tools, which senses 5G communication channels and other compatible platforms and identifies the deeper insights from data collected from 5G enabled mobile devices.

The server computing device 108 may include the program 104 and may communicate with the computing device 102 via the network 106. The server computing device 108 may be a single computing device, a laptop, a cloud-based collection of computing devices, a collection of servers, and other known computing devices. The server computing device 108 may be combined with a 5G network 106, creating a server computing device that is a cloud-based network that may be a fixed access network. In this embodiment, the combination of server computing device 108 and 5G network 106 may use radio signals, backhaul networks, optical access networks, optical metro networks, and optical core networks to relay the data from the computing device 102 to the server computing device 108 in combination with the 5G network 106. Radio signals are used to carry radio broadcasts and establish wi-fi connections for cellular devices. Backhaul networks comprise the intermediate links between a core network and the small subnetworks at the edge of the network, which in this embodiment would be the cloud-based storage capabilities of the 5G network 106. An optical network uses single-mode optical fiber in a outside plant to require upstream and downstream signals share the same fiber on separate wavelengths.

Figure 2:
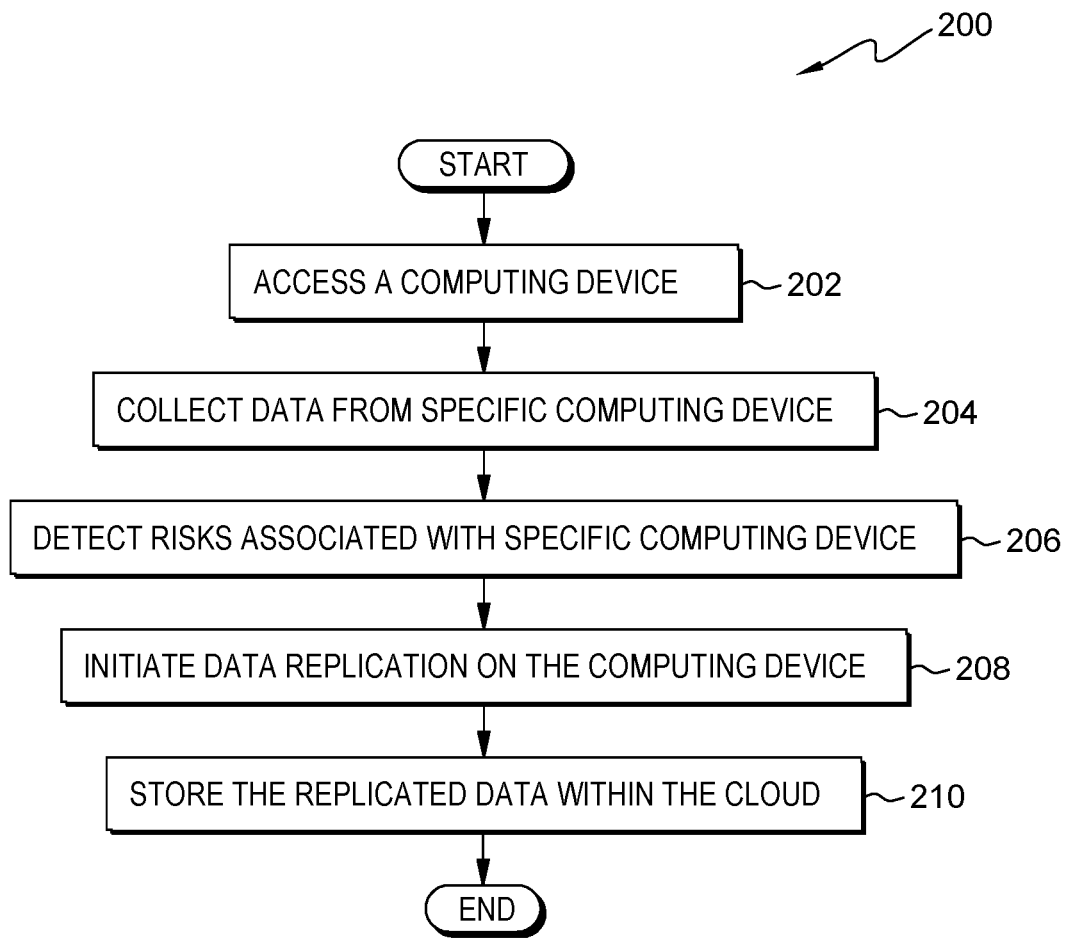
FIG. 2 is a flowchart illustrating operational steps for running a data protection while detecting risk program, in accordance with an embodiment of the present invention.

FIG. 2 is a flowchart 200 illustrating operational steps for replicating data after detecting risks for a computing device via a 5G network.

In step 202, the program 104 accesses a computing device 102 from a list of computing devices capable of being monitored. In this embodiment, the program 104 receives opt-in/opt-out permission from a user to gain access to a specific computing device from a list of computing devices capable of being monitored by the program 104. In this embodiment, the program 104 already resides on the computing device 102 and remains dormant on the computing device 102 until the program 104 is granted permission to access the data stored on the computing device 102. In this embodiment, the program 104 may access a number of computing devices from a list of computing devices capable of being monitored and capable of having data replicated. For example, the program 104 accesses a user's smart phone to monitor and replicate data if needed, which is on a list of the user's computing devices.

In step 204, the program 104 accesses data from the specific computing device (e.g. the computing device 102) that is capable of being replicated. In this embodiment, the program 104 accesses the data found on the computing device 102 In this embodiment, the program 104 accesses data that is capable of being replicated, which may include text messages, phone numbers, and photos. In another embodiment, the program 104 accesses data that is at risk on the computing device 102. For example, the program 104 accesses a call log and a photo library from a user's specific computing device (e.g. the computing device 102).

In step 206, the program 104 detects the risks associated to the computing device 102. In this embodiment, the program 104 determines the location of the computing device 102, determines mobility of the computing device 102, determines the speed of the computing device, determines the surroundings of the computing device 102, and calculates the risks associated with the location, speed, and surroundings of the computing device 102. In this embodiment, the program 104 uses a risk determination algorithm, which is defined as a cognitive system defined to map content using a priority engine, to detect the risks associated to the specific computing device. In this embodiment, the program 104 transmits instructions to the risk determination algorithm to access the specific computing device's sensors to detect the specific location of the computing device 102. The program 104 may use the specific location as a way of determining speed of the computing device 102 and as a way of determining the surrounding conditions of the computing device 102. For example, the program 104 locates the specific location of the computing device 102 as a location with a cliff and determines the computing device 102 is stationary, then the program 104 may not calculate this current surrounding as a risk. However, the program 104 locates the specific location of the computing device 102 as a location with a waterfall, which may be considered a cliff with running water, and determines the computing device 102 is stationary, then the program 104 may calculate this current surrounding a minor risk. Furthermore, the program 104 locates the specific location of the computing device 102 as a location with a cliff and determines that the computing device 102 is accelerating at 9.8 meters per second, which is the definition of a free-falling object due to gravity, then the program 104 determines this current surrounding as a major risk.

Moreover, in this embodiment, the program 104 may use the 5G network 106 to communicate with the computing device 102, in order to establish a service orchestration instance. In this embodiment, each risk that the program 104 is given a numerical value. Greater numerical values indicate a higher value, while lesser numerical values indicate a lesser value. In this embodiment, the program 104 defines a major risk as a numerical value reaching or exceeding a configurable threshold. Conversely, the program 104 defines a minor risk as a numerical value as failing to reach or exceed the configurable threshold. Furthermore, the program 104 may prioritize a minor risk for a specific data type that needs to be replicated if upon failing to reach or exceed the configurable threshold. In that case, the program 104 prioritizes each data type is given a priority position. For example, a specific user values its photo library over its text messages and call logs; the program 104 determines a minor risk to the computing device 102; and the program 104 places the photo library in a priority position in front of the other data types on the computing device 102. In this embodiment, the risk identification algorithm prioritizes data types using a priority engine. In this embodiment, this prioritization may be user input driven. In another embodiment, the prioritization may be available space driven, and certain data types may not be the appropriate size to be replicated efficiently.

To determine the risk levels associated with the computing device 102, the program 104 transmits instructions to sensors within the computing device 102 to capture surroundings, conditions, and risks. For example, the program 104 uses audio and video inputs in conjunction with a GPS location tracker on a smart phone to determine elevation of the phone, proximity to a cliff or waterfall, speed of the smart phone, and temperature of the smartphone to anticipate if a data replication is needed to protect data on the smart phone upon the quantified risks reaching a predetermined threshold. In another embodiment, the program 104 may determine the threshold dynamically and in real time, which would make the program 104 adjust this numerical value depending on the risk found at the time of the detection.

In step 208, the program 104 initiates data replication of the data on the computing device 102. In this embodiment, once the program 104 determines that the risk associated with the surrounding conditions reaches a predetermined threshold of risk, the program 104 automatically initiates data replication on the computing device 102 to backup all data that is capable of being replicated. In this embodiment, the program 104 creates a logical channel using radio broadcasts and the 5G network 106 to transmit instructions and data to and from the server computing device 108. In this embodiment, the program 104 autonomously initiates data replication of the data on the computing device 102. In another embodiment, the program 104 initiates data replication after receiving user approval to replicate data from a user. For example, once the program 104 determines that the smart phone is at severe risk of losing all data due to its surroundings, the program 104 automatically initiates a data replication task that is transmitted via the 5G network 106, and this data replication replicates all crucial data and transmits the data safely to the server computing device 108. In another embodiment, the program 104 may abort the data replication of the data if the risk identification algorithm detects a reduction of quantified risks below the predetermined threshold.

In step 210, the program 104 stores the replicated data within the server computing device 108. In this embodiment, the program 104 may use a 5G network 106 to transmit and store the replicated data. In this embodiment, the program 104 creates a logical channel to facilitate the transfer of replicated data to the server computing device 108. In this embodiment, the 5G network 106 ensures that the data replication will simultaneous with the storage of the replicated dated and ensures the protection of the replicated data. In another embodiment, the program 104 uses radio broadcast, in conjunction with the 5G network 106 and various optical networks, to transmit and store the replicated data on the server computing device 108. In another embodiment, the program 104 stores the replicated data within the 5G network 106 acting as a cloud-based storage.

Figure 3:
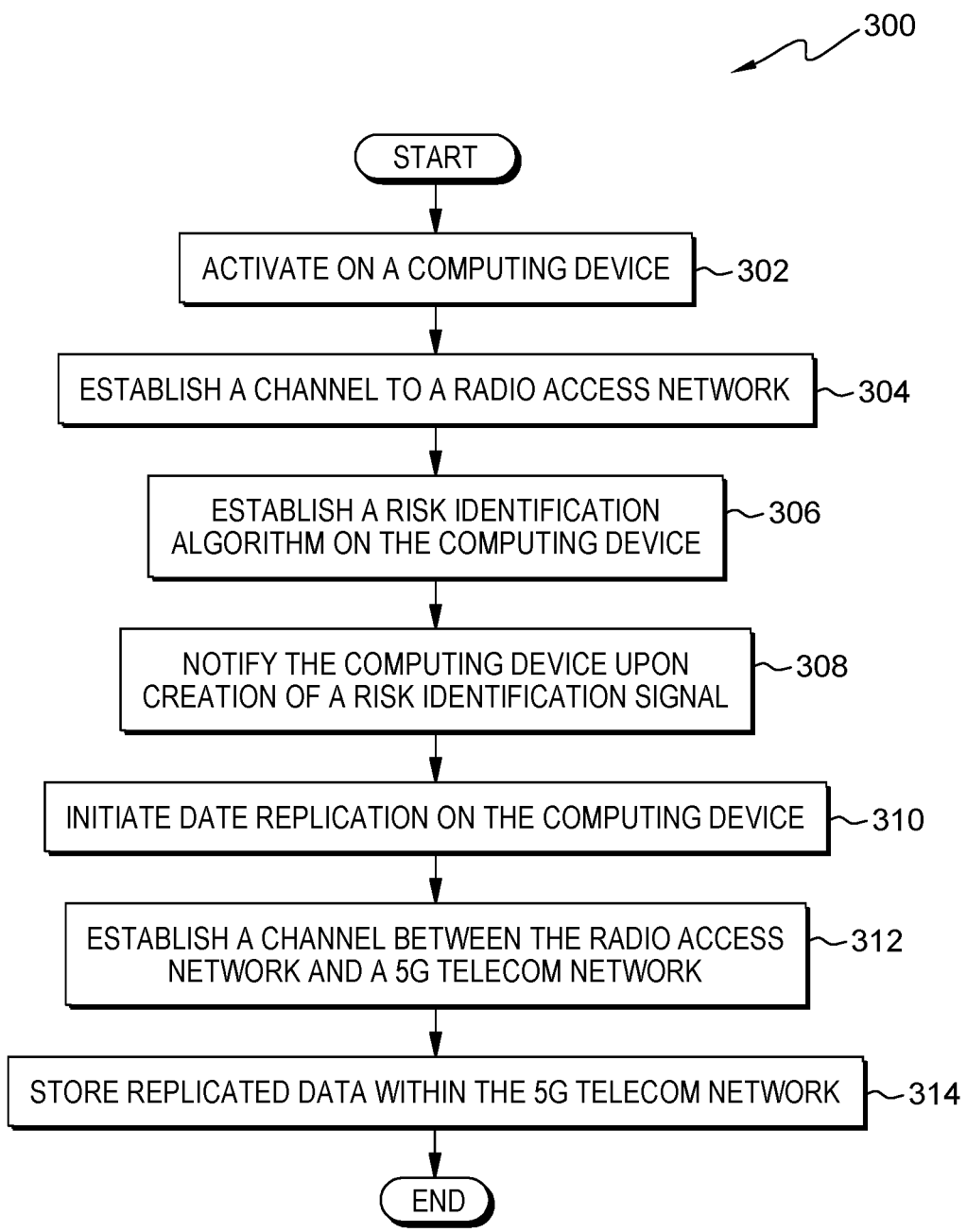
FIG. 3 is a flowchart illustrating a dynamic risk detection program on a computing device completing a data replication within a 5G network, in accordance with at least one embodiment of the invention.

FIG. 3 is a flowchart 300 illustrating a dynamic risk detection program on a computing device completing a data replication within a 5G network, in accordance with at least one embodiment of the invention.

At step 302, the program 104 activates on a computing device 102. In this embodiment, the program activates on a computing device 102 and gains access to the computing device operating system. The computing device's 102 operating system may contain a data backup manager, a peripheral computing device controller, a user space data reader, a data streamer, a device operating system connector interface, a GPS manager, and a priority engine.

At step 304, the program 104 establishes a channel to a radio access network. In this embodiment, the program 104 may establish a channel consisting of a 5G control command and a 5G input stream connected to an eNode B. An eNodeB is the hardware that is connected to a connected device network that communicates directly wirelessly with mobile handsets, like a base transceiver station in GSM networks. In this embodiment, the program 104 transmits instructions to the computing device 102 to allow the established channels to access the computing device's operating system.

In step 306, the program 104 establishes a risk identification algorithm on the computing device 102. In this embodiment, the program 104 establishes a risk identification algorithm, which is a cognitive system that comprises content to map data using a priority engine to determine the importance of specific data on a computing device 102. The priority engine used in the risk identification algorithm determines the importance of specific data by assigning a numerical value with specific types of data. In this embodiment, the program 104 transmits instructions to the computing device 102 upon gaining access to allow the risk identification algorithm to enter the computing device 102. In this embodiment, after the program 104 transmits instructions to the risk identification algorithm to gain access to the computing device, the program 104 transmits instructions to the risk identification algorithm to access the computing devices internal and external sensors to track specific location, speed, and surrounding conditions of the computing device 102. In this embodiment, the program 104 transmits instructions to the risk identification algorithm to calculate the level of risks associated with the computing device by giving each risk a numerical value, and a predetermined level of risks trigger a signal. In this embodiment, the risk identification algorithm may trigger a signal to the established channels, and the program 104 uses this signal as a predetermined threshold to initiate a data replication of the computing device 102. In this embodiment, the risk identification algorithm prioritizes data types using a priority engine. In this embodiment, this prioritization may be user input driven. In another embodiment, the prioritization may be available space driven, and certain data types may not be the appropriate size to be replicated efficiently.

In step 308, the program 104 notifies the computing device 102 upon creation of a risk identification signal. In this embodiment, the program 104 transmits a notification to the computing device 102 once an established signal is established due to a predetermined threshold of risk is identified by the risk identification algorithm. This notification initiates a data replication process to occur on the computing device 102 by the program 104.

In step 310, the program 104 initiates data replication on the computing device 102. In this embodiment, once the risk identification algorithm has reached a predetermined threshold and a signal is established, the program 104 begins replicating data on the computing device 102. In this embodiment, the program 104 analyzes the data on the computing device 102 to determine the level of sensitiveness of data using the risk identification algorithm, which determines the risks surrounding the computing device and gives a quantifiable value to each type of data; and the program 104 begins replicating major data types before moving to minor data types. In this embodiment, the program 104 uses the 5G established channels, which makes the data replication simultaneous. In another embodiment, the program 104 may abort the data replication task if the risk identification algorithm detects the reduction of quantified risks below the predetermined threshold.

At step 312, the program 104 establishes a channel between the radio access network and a 5G network 106. In this embodiment, after the data replication process is initiated, the program 104 establishes a channel between the eNodeB and a 5G network 106, and the 5G network 106 is a fixed access network that may be a cloud-based data storage system. In another embodiment, the program 104 may establish an additional channel with an optical accesses network. In another embodiment, the program 104 may establish an additional channel with an optical metro network or optical core network.

At step 314, the program 104 stores replicated data within the 5G network 106 via established channels. In this embodiment, the program 104 stores the replicated data within a cloud-based data storage system that may be housed within a 5G network 106 by using the established channels between the eNobeB and the 5G telecom network 106. In this embodiment, the 5G network comprises a 5G infrastructure management plane and a service orchestration that communicate between each other. In another embodiment, the program 104 may store replicated data within a server computing device 108 after using the established channels and the 5G network 106.

Figure 4:
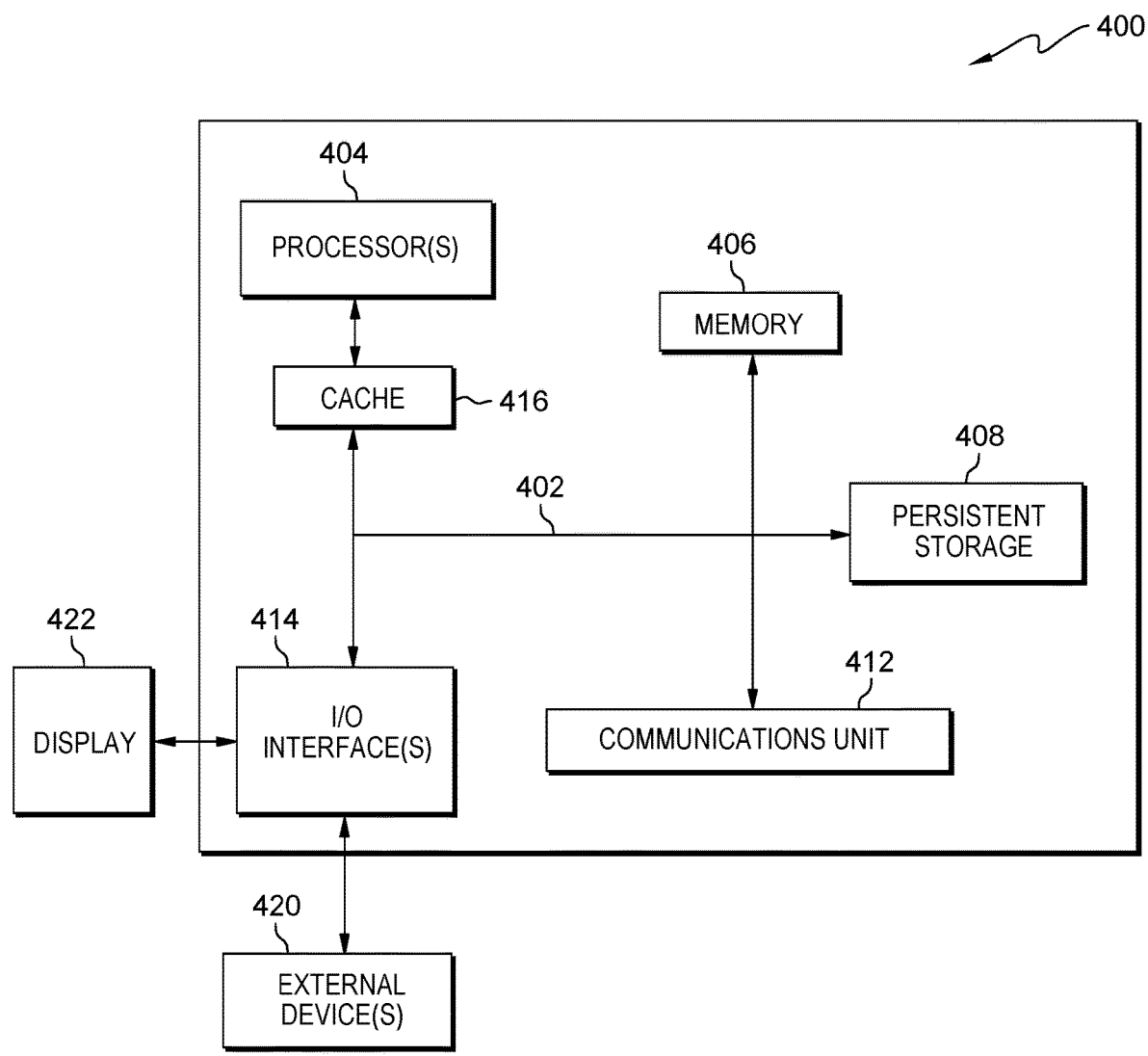
FIG. 4 depicts a block diagram of components of computing systems of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 410, and an input/output (I/O) interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 includes one or more network interface cards. The communications unit 410 may provide communications through the use of either or both physical and wireless communications links. The program 104 may be downloaded to the persistent storage 408 through the communications unit 410.

The I/O interface(s) 412 allows for input and output of data with other devices that may be connected to a mobile device, an approval device, and/or the server computing system 110. For example, the I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 412. The I/O interface(s) 412 also connect to a display 420.

The display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Figure 5:
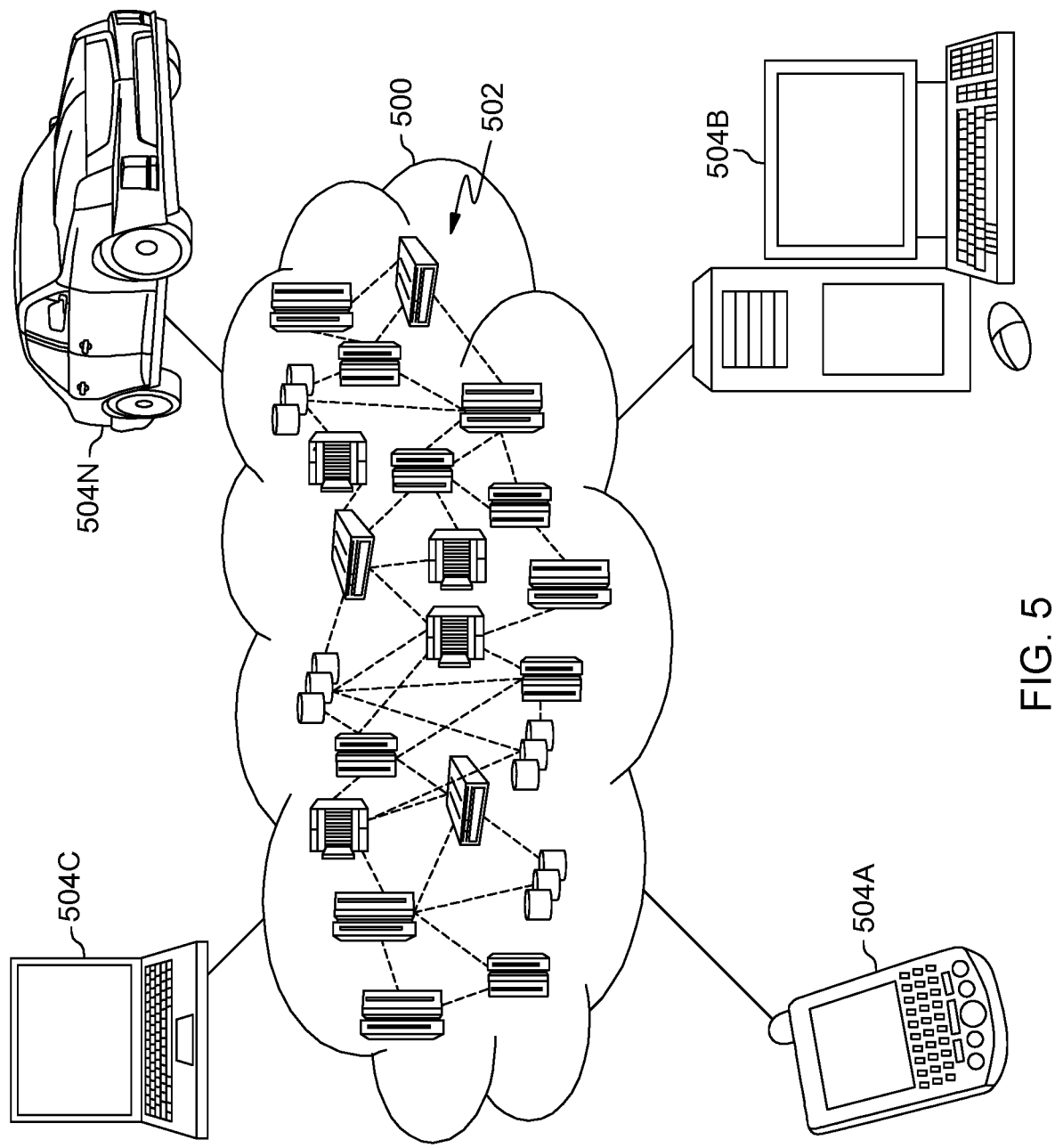
FIG. 5 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 5, illustrative cloud computing environment 500 is depicted. As shown, cloud computing environment 500 includes one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
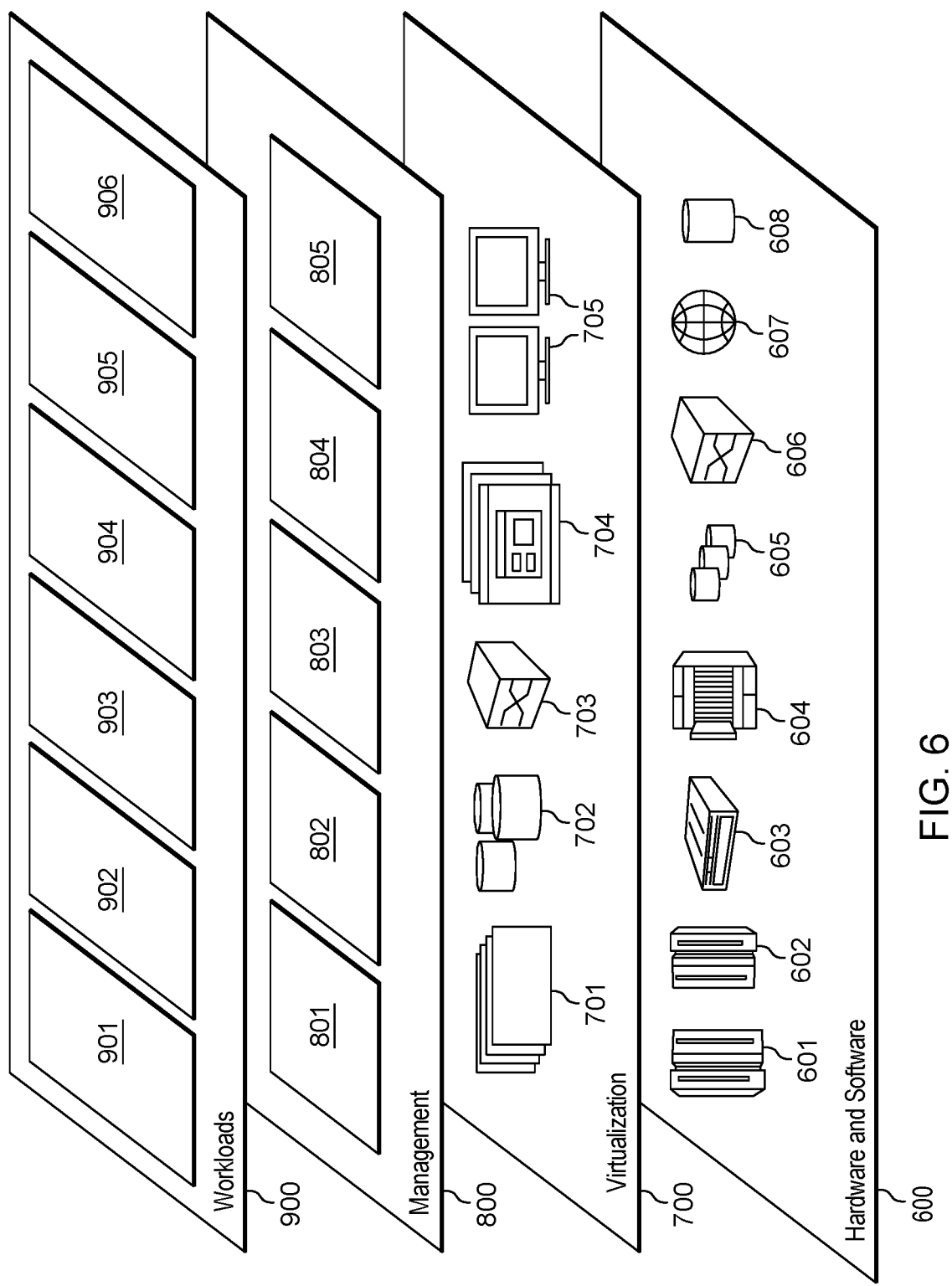
FIG. 6 depicts abstraction model layers according to an embodiment of the present invention.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided: Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608. Virtualization layer 700 provides an abstraction layer from which the following examples of virtual entities may be provided: virtual servers 701; virtual storage 702; virtual networks 703, including virtual private networks; virtual applications and operating systems 704; and virtual clients 705.

In one example, management layer 800 may provide the functions described below. Resource provisioning 801 provides dynamic procurement of computing resources and other resources that are utilized to perform tasks within the cloud computing environment. Metering and Pricing 802 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 803 provides access to the cloud computing environment for consumers and system administrators. Service level management 804 provides cloud computing resource allocation and management such that required service levels are met. Service Level Agreement (SLA) planning and fulfillment 805 provide pre-arrangement for, and procurement of, cloud computing resources for which a future requirement is anticipated in accordance with an SLA.

Workloads layer 900 provides examples of functionality for which the cloud computing environment may be utilized. Examples of workloads and functions which may be provided from this layer include: mapping and navigation 901; software development and lifecycle management 902; virtual classroom education delivery 903; data analytics processing 904; transaction processing 905; and data replication storage 906.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    accessing data capable of being replicated from a computing device;
    detecting risks of the computing device, based on identified contextual activity being performed on the computing device, user type, and the computing device's surroundings, location, speed, and condition;
    scoring the detected risks based on the identified contextual activity, wherein the contextual activity requirements are environmental conditions that, when satisfied, initiate data replication on the computing device, wherein the environmental conditions are an environmental location, elevation of the computing device, proximity of the computing device to a cliff, temperature of the computing device, and acceleration metrics of the computing device reaching a threshold level of downward acceleration;
    establishing channels using radio waves on a 5G network to facilitate simultaneous transfer of the replicated data; and
    initiating data replication in response to identified contextual activity requirements being satisfied using the 5G network.

2. The computer-implemented method of claim 1, wherein detecting risks of the computing device comprises ranking data types on the computing device using a priority engine.

3. The computer-implemented method of claim 1, wherein detecting risks on the computing device comprises simultaneously accessing the computing device's audio and visual sensors to detect changes in the computing device's location, speed, condition, and surroundings.

4. The computer-implemented method of claim 1, wherein initiating data replication comprises replicating data based on the user-specific priority of the data type.

5. The computer-implemented method of claim 1, wherein the predetermined threshold is a quantified level of risk associated with the computing device to prompt data replication.

6. The computer-implemented method of claim 1, wherein establishing channels using radio waves to facilitate simultaneous transfer of the replicated data further comprises storing the replicated data on a server computing device via a 5G network.

7. The computer-implemented method of claim 1, further comprising transmitting instructions to abort data replication in response to storing replicated data reaching 5G cloud network storage.

8. The computer-implemented method of claim 1, further comprising aborting data replication automatically after determining a reduction of detected risks below the predetermined threshold.

9. The computer-implemented method of claim 1, further comprising:
    prioritizing data to be replicated during initiation of data replication based on data type, detected risk, and available space.

10. A computer program product comprising:
one or more computer readable storage media and program instructions stored on the one or more computer readable storage media, the program instructions comprising:
- program instructions to access data capable of being replicated from a computing device;
- program instructions to detect risks, based on identified contextual activity being performed on the computing device, user type, and the computing device's surroundings, location, speed, and condition;
- program instructions to score the detected risks based on the identified contextual activity, wherein the contextual activity requirements are environmental conditions that, when satisfied, initiate data replication on the computing device, wherein the environmental conditions are an environmental location, elevation of the computing device, proximity of the computing device to a cliff, temperature of the computing device, and acceleration metrics of the computing device reaching a threshold level of downward acceleration;
- program instructions to establish channels using radio waves on a 5G network to facilitate simultaneous transfer of the replicated data; and
- program instructions to initiate data replication in response to identified contextual activity requirements being satisfied using the 5G network.

11. The computer program product of claim 10, wherein the program instructions to detect risks of the computing device comprise program instructions to rank data types on the computing device using a priority engine.

12. The computer program product of claim 10, wherein the program instructions to detect risks of the computing device comprise simultaneously accessing the computing device's audio and visual sensors to detect changes in the computing device's location, speed, condition, and surroundings.

13. The computer program product of claim 10, wherein the program instructions to initiate data replication on the computing device once the risks are determined to reach a predetermined threshold comprise program instructions to replicate data based on the user-specific priority of the data type.

14. A computer system comprising:
one or more computer processors;
one or more computer readable storage media; and
program instructions stored on the one or more computer readable storage media for execution by at least one of the one or more processors, the program instructions comprising:
- program instructions to access data capable of being replicated from a computing device;
- program instructions to detect risks, based on identified contextual activity being performed on the computing device, user type, and the computing device's surroundings, location, speed, and condition;
- program instructions to score the detected risks based on the identified contextual activity, wherein the contextual activity requirements are environmental conditions that, when satisfied, initiate data replication on the computing device, wherein the environmental conditions are an environmental location, elevation of the computing device, proximity of the computing device to a cliff, temperature of the computing device, and acceleration metrics of the computing device reaching a threshold level of downward acceleration;
- program instructions to establish channels using radio waves on a 5G network to facilitate simultaneous transfer of the replicated data; and
- program instructions to initiate data replication in response to identified contextual activity requirements being satisfied using the 5G network.

15. The computer system of claim 14, wherein the program instructions to detect risks of the computing device comprise program instructions to rank data types on the computing device using a priority engine.

16. The computer system of claim 14, wherein the program instructions to detect risks of the computing device comprise program instructions to simultaneously access the computing device's audio and visual sensors to detect changes in the computing device's location, speed, condition, and surroundings.

17. The computer system of claim 14, wherein the program instructions to initiate data replication on the computing device once the risks are determined to reach a predetermined threshold comprise program instructions to replicate data based on the user-specific priority of the data type.

18. The computer system of claim 14, wherein the program instructions stored on the one or more computer readable storage media further comprise program instructions to transmit instructions to abort data replication in response to storing replicated data reaching 5G cloud network storage.

* * * * *